United States Patent [19]

Kizuik et al.

[11] Patent Number: 4,944,001
[45] Date of Patent: Jul. 24, 1990

[54] ROTARY DIAL PULSE RECEIVER

[75] Inventors: Brent L. Kizuik; Richard D. Gurevich, both of Winnipeg, Canada

[73] Assignee: Comcheq Services Limited, Winnipeg, Canada

[21] Appl. No.: 202,633

[22] Filed: Jun. 6, 1988

[30] Foreign Application Priority Data

Jun. 19, 1987 [CA] Canada ................................ 540151

[51] Int. Cl.⁵ ............................................ H04M 1/64
[52] U.S. Cl. ................................... 379/386; 379/377; 379/286
[58] Field of Search ............... 379/93, 94, 98, 27, 379/31, 105, 372, 286, 287, 386, 351, 350, 104, 339; 375/94, 95, 11, 12, 13; 371/6, 22

[56] References Cited

U.S. PATENT DOCUMENTS 3,927,264 12/1975 Fish et al. ..................... 379/372 X

FOREIGN PATENT DOCUMENTS

| 919323 | 1/1973 | Canada . |
| 930486 | 7/1973 | Canada . |
| 938363 | 12/1973 | Canada . |
| 1003140 | 1/1977 | Canada . |
| 1017473 | 9/1977 | Canada . |
| 1019484 | 10/1977 | Canada . |
| 1030677 | 5/1978 | Canada . |
| 1048184 | 2/1979 | Canada . |
| 1118125 | 2/1982 | Canada . |
| 1140284 | 1/1983 | Canada . |
| 0226325 | 6/1987 | European Pat. Off. ............ 379/386 |

OTHER PUBLICATIONS

"Dial Pulse Detector", C. R. Bringol et al., vol. 18, No. 4, Sep. 1975, pp. 991-992.
Signetics Corporation, Four-Bit Universal Shift Register 10141, 12/1972, pp. 5-74.

Primary Examiner—Jin F. Ng
Assistant Examiner—Randall S. Vaas
Attorney, Agent, or Firm—Beveridge, DeGrandi & Weilacher

[57] ABSTRACT

Apparatus and method for receiving and decoding the bursts of line current activity produced by rotary dial action in dialing a sequence of digits. In accordance with the apparatus of the present invention, a rotary dial pulse receiver counts the number of bursts of line current activity produced by a given telephone handset in dialing a standard test digit. A conversion means selects a conversion algorithm which is effective to express the relationship between the number of bursts counted and the value of the digit dialed and applies the selected algorithm to decode the value of subsequent non-standard digits dialed. In accordance with the method of the present invention, a method of converting the number of bursts in line current activity produced through rotary dial action in dialing a sequence of digits by selecting and applying a conversion algorithm is described.

23 Claims, 5 Drawing Sheets

ROTARY DIAL PULSE RECEIVER

This invention generally relates to an apparatus and method for receiving and decoding bursts of line current activity produced by rotary dial action in dialing a sequence of digits.

BACKGROUND OF THE INVENTION

In conventional use, the rotary dial of a telephone handset is used to dial the telephone number of the telephone handset to which a telephone call is to be placed. Telephone handsets can however also be used to access and input data to remote data processing equipment connected to the telephone network. For example, telephone bill payment services allow subscribers to pay bills using conventional telephone handsets. The subscriber can access such a bill payment service by placing a call to the bill payment data processing equipment. A computer generated voice may then for example, ask the subscriber to enter the account and the amount to be paid by dialing the appropriate numbers on the subscriber's rotary dial. The electrical signals produced by the rotary dialing action are received, decoded into the numerical value of the digits dialed and inputted into the bill payment computer which debits the subscriber's account and issues a cheque in favour of the account to be paid. In such applications, it is of course essential that the electrical signals produced by rotary dialing action can be accurately decoded into the numerical value of the digits dialed.

Conventional rotary dial telephones produce pulse trains representing the digits dialed. Under dialing action, the rotary dial contacts are caused to open and close thereby repetitively breaking and making the line current in the telephone subscriber's line. The number of break pulses corresponds numerically to the digit dialed. Rotary handsets typically produce a pulse repetition rate of about 10 pulses per second. The break interval is typically about 60 milliseconds and the make interval about 40 milliseconds.

While it might be supposed that a rotary dial handset would induce square wave current pulses on the telephone line, in practice the dial pulse current is heavily distorted primarily due to line inductance and direct current blocking through central switching equipment. Due to direct current blocking, the square wave current pulses are differentiated producing positive and negative going impulses corresponding to the leading and trailing edge of each square wave current pulse. These impulses are typically followed by damped ringing and appear as bursts of line current activity. In certain instances, the ringing is sufficiently prolonged that adjacent bursts of line current activity are bridged together to form a single long burst. On some rotary phones, the rewind action of the dial and the activation of the speech muting circuit generates noise pulses which can further distort the pulse train. Moreover, some rotary dial telephone handsets do not produce the desired break interval of about 60 milliseconds but instead produce break intervals as short as 20 to 25 milliseconds.

The effect of such distortions is to render it difficult to reliably decode received bursts of line current activity. Prior art pulse detection circuitry typically attempts to reconstitute square wave current pulses produced by the rotary dial contacts from the differentiated pulse train prior to decoding the dialed digits. For example, Canadian Patent No. 930,486 describes the use of a pulse generator to convert a received sequence of dial pulses into more distinct sets of input pulses. However, in cases where the distortion is severe, proper decoding is virtually impossible with conventional systems.

It has been known that the number of bursts of line current activity produced in dialing a given digit varies depending on the telephone handset used. We have discovered that for a given telephone handset, the relationship between the numerical value of the digit dialed and the number of bursts of line current activity produced in dialing such digit is constant, regardless of which digit is dialed and that such relationship can be represented by a simple algorithm. Thus, in accordance with the present invention, the algorithm specific to each dialing telephone is selected and applied to the number of bursts of line activity associated with each digit dialed to decode the numerical value of each digit dialed. This is accomplished by counting the number of bursts of line current produced by the telephone handset connected to the computer in dialing a standard test digit. Based on this count and the known numerical value of the test digit, the conversion algorithm effective to convert the count to the numerical value of the associated digit is selected.

In practice, the standard test digit may conveniently be the first digit dialed by the subscriber immediately prior to dialing other digits representing data to be inputted to the data processing equipment. After selecting the appropriate conversion algorithm based on the system response to the test digit, the conversion algorithm is applied to the number of bursts produced by the same subscriber handset in dialing such other digits representing data to be inputted to the data processing equipment. Thus, the numerical value of each digit dialed is decoded and is available to be inputted to the data processor. In counting the number of bursts of line current associated with each digit dialed, no attempt is made to identify and reject bursts of line current activity resulting from noise spikes produced, for example, by the rewind action of the rotary dial or by the speech muting circuit of the telephone handset. Nor does the present invention attempt to resolve a single burst of line current activity which has been produced by successive dial pulses which have been bridged together due to ringing, into its two constituent pulses. Instead, all bursts associated with the dialing of each digit are counted.

More particularly, in accordance with the present invention there is provided a rotary dial pulse receiver comprising detection means for detecting bursts of line current activity produced by rotary dial action in dialing a sequence of digits including a predetermined test digit at a predetermined location in the sequence of digits dialed, counting means connected to the detection means for providing an output count of the number of detected bursts of line current activity associated with each digit dialed, conversion means connected to the counting means and responsive to the detection of said predetermined test digit for selecting a conversion algorithm effective to convert the output count associated with the predetermined test digit to the numerical value of said predetermined digit dialed and responsive to the detection of other digits in said sequence of digits for applying said conversion algorithm to convert the output count associated with each of said other digits to the numerical value of said other digit dialed.

In accordance with the present invention there is also provided a method of decoding bursts of line current activity produced by rotary dial action in dialing a sequence of digits comprising the steps of counting the number of bursts of line current activity produced by dialing a predetermined test digit at a predetermined location in the sequence of digits dialed, selecting a conversion algorithm effective to convert the number of said bursts of line current activity produced by dialing said predetermined test digit to the numerical value of said predetermined test digit dialed, counting the number of bursts of line current activity produced by dialing each other digit in said sequence of digits, applying said conversion algorithm to convert the number of bursts of line current activity produced by dialing each said other digit in said sequence of digits to the numerical value of each said other digit dialed.

BRIEF DESCRIPTION OF THE DRAWINGS

A preferred embodiment of the present invention will now be described in conjunction with the accompanying drawings in which.

DESCRIPTION OF THE PREFERRED EMBODIMENT

Figure 1:
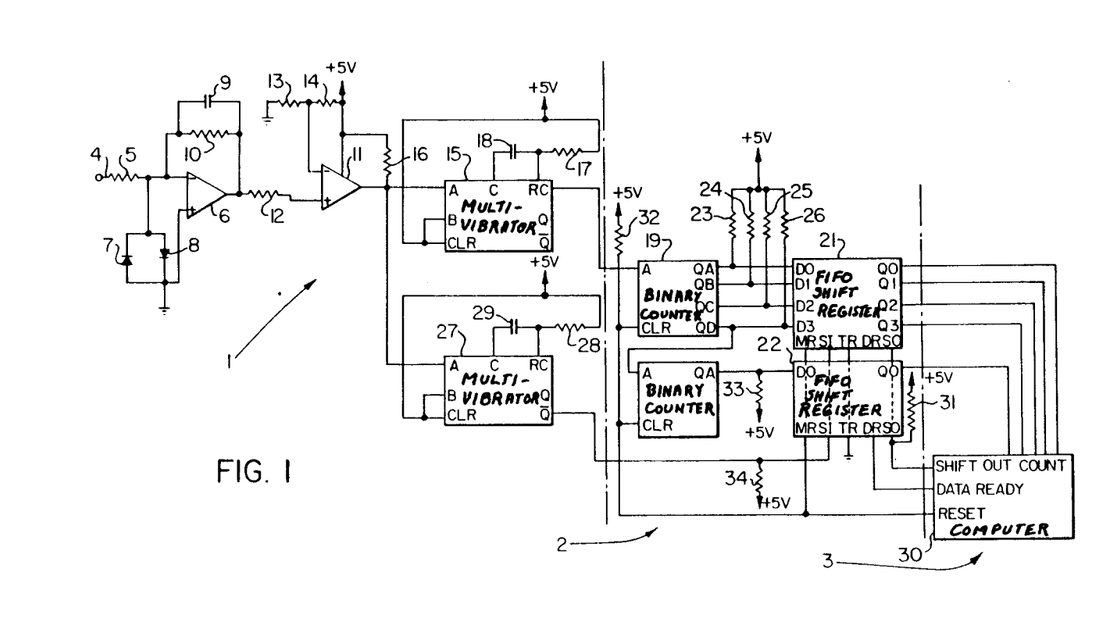
FIG. 1 (is a schematic circuit diagram of a rotary dial pulse receiver embodying this invention.

The rotary dial pulse receiver shown in FIG. 1 generally comprises detection means 1, counting means 2, and conversion means 3.

Bursts of line current activity are applied to detection means 1 through input line 4 and resistor 5 to the inverting input of differential amplifier 6. Differential amplifier 6 by way of example, can be one of the TLC 27 series of OP amps manufactured by Texas Instruments. The non-inverting input of differential amplifier 6 is applied to ground. Opposite poled pulse limiting diodes 7 and 8 are connected across the inputs to differential amplifier 6. Feedback capacitor 9 and resistor 10 are connected in parallel between the output and the inverting input of differential amplifier 6.

The output of differential amplifier 6 is applied to the non-inverting input of differential amplifier 11 through input matching resistor 12. Differential amplifier 11 by way of example, can be a LM 393 integrated circuit package which is manufactured by National Semiconductor. The inverting input to differential amplifier 11 is connected to the junction of voltage dividing resistors 13 and 14 which are connected in series between ground and the +5 volt supply.

The output of differential amplifier 11 is applied to the A input of retriggerable monostable multivibrator 15. Multivibrator 15 by way of example, can be one half of a SN 74123 dual integrated circuit package which is manufactured by Texas Instruments. Pull-up resistor 16 is connected between the +5 volt supply and the A input of multivibrator 15. The B and Clear inputs of multivibrator 15 are connected to the +5 volt supply. The Rext/Cext input to multivibrator 15 is connected to the +5 volt supply through external resistor 17. External timing capacitor 18 is connected between Rext/Cext and Cext of multivibrator 15. The Q output of multivibrator 15 constitutes the output of detection means 1 and the input to counter means 2.

The input to counter means 2 is applied to the Clock input of binary counter 19. The QD output of binary counter 19 is applied to the Clock input of binary counter 20 providing a five bit binary count capability at outputs QA, QB, QC, QD of counter 19 and QA of counter 20. Binary counters 19 and 20, by way of example, may each be one half of a SN74LS393 dual 4-bit binary counter which is manufactured by Texas Instruments.

The parallel five bit binary count output of counters 19 and 20 is applied to the inputs of FIFO shift registers 21 and 22. FIFO shift registers 21 and 22 by way of example, may each be a CD 40105 integrated circuit package which is manufactured by RCA. Outputs QA, QB, QC, QD of counter 19 are applied to inputs D0, D1, D2 and D3 of FIFO shift register 21 and output QA of counter 20 is applied to input D0 of FIFO shift register 22. Inputs D0, D1, D2 and D3 of FIFO shift register 21 and input D0 of FIFO shift register 22 are also connected to the +5 volt supply through level conversion resistors 23, 24, 25, 26 and 33.

The shift-in inputs of FIFO shift registers 21 and 22 are connected to the /Q output of retriggerable monostable multivibrator 27 and to the +5 volt supply through level conversion resistor 34. Monostable multivibrator 27, by way of example may be one half of a SN 74123 dual retriggerable monostable multivibrator integrated circuit package which is manufactured by Texas Instruments. The A input of monostable multivibrator 27 is connected to output of differential amplifier 11 and to the +5 volt supply through pull up resistor 16. The B and Clear inputs of multivibrator 27 are connected to the +5 volt supply. The Rext/Cext input to multivibrator 27 is connected to the +5 volt supply through external resistor 28. External timing capacitor 29 is connected between the Cext and Rext/Cext inputs of multivibrator 27. The 3-State inputs of FIFO shift registers 21 and 22 are connected to ground. FIFO shift registers 21 and 22 can accumulate up to 16 digits which are available in five-bit binary form at outputs Q0, Q1, Q2, Q3 of FIFO shift register 21 and output Q0 of FIFO shift register 22.

The five-bit binary output of FIFO shift registers 21 and 22 are applied to conversion means 3 which by way of example, may be a preprogrammed computer 30. The five-bit binary output of FIFO shift registers 21 and 22 are applied to the data inputs of computer 30. Computer 30 is configured to accept as an input the Data-Out Ready output of FIFO shift register 22 and to provide output pulses to the Shift-Out inputs of FIFO shift registers 21 and 22. Computer 30 is also configured to deliver reset pulses to the Master Reset inputs of FIFO shift registers 21 and 22 and to the Clear inputs of binary counters 19 and 20. The Shift-Out inputs of FIFO shift registers 21 and 22 and the Clear inputs of binary counters 19 and 20 are also connected to the +5 volt supply through resistors 31 and 32. The connections to the Master Reset, Shift-In, 3-State and Shift-Out pins of FIFO shift register 22 shown in FIG. 1 are also made to the corresponding pins of FIFO shift register 21 and are shown schematically by way of dotted lines.

Typical values for the components in the circuit of FIG. 1 are as follows:

| Resistors | 5 | 2 K ohm |
|---|---|---|
| | 10 | 22 K ohm |
| | 12 | 5.1 K ohm |
| | 13,14 | 100 K ohm |
| | 16,23,24–26,31–34 | 4.7 K ohm |
| | 17 | 15 K ohm |
| | 28 | 82 K ohm |
| Capacitors | 9 | .1 microfarad |
| | 18 | 2.2 microfarad |
| | 28 | 10 microfarad |

Figure 2A:
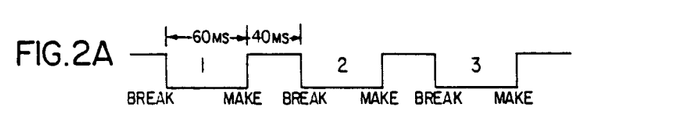
FIGS. 2A, 2B and 2C are representations of waveforms which are useful in explaining and illustrating the operation of this invention in association with a particular telephone handset.
Figure 2B:
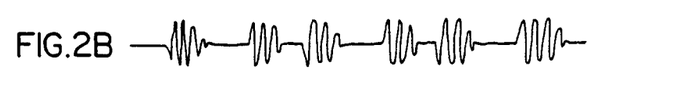

The operation of the rotary dial pulse detector will now be described with reference to FIG. 1, FIG. 2, FIG. 3 and FIG. 4. As shown in FIG. 2A, dialing action repetitively breaks and makes the line current in a telephone subscribers loop. In the example shown, the number 3 has been dialed, breaking and making the line current three times. FIG. 2B shows a representation of the bursts of line current activity produced by the dialing action represented in FIG. 2A after having been differentiated in passing through central switching equipment. It will be noted that bursts of line current activity are produced by each breaking and each making of line current and are sustained due to damped ringing. The bursts of line current activity shown in FIG. 2B are applied to detection means 1 through input line 4 and are amplified and filtered by differential amplifier 6. The values of resistors 5 and 10 and capacitor 9 are set to produce a gain of 10 and a frequency roll-off of approximately 800 Hz. Diodes 7 and 8 act as impulse limiters to protect the input to differential amplifier 6. Over voltage limiting is provided by the internal clamping of differential amplifier 6.

The amplified and frequency limited bursts of line current activity are passed to differential amplifier 11 which acts as a threshold detector. Resistor 12 provides input matching while resistors 13 and 14 set the threshold voltage. The bursts of line current activity which exceed the threshold voltage are passed to the clock input of retriggerable monostable vibrator 15. Resistor 16 is a pull-up to provide level translation into monostable multivibrator 15.

Figure 2C:
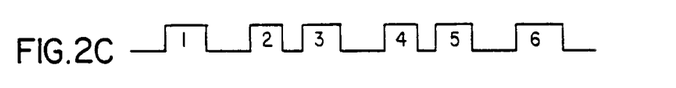

Retriggerable monostable multivibrator 15 acts as a first detection means to detect bursts of line current activity. With the B and Clear inputs of monostable multivibrator 15 tied high, the Q output will produce a positive pulse when a negative going voltage transition of the first received burst of line current activity appears at the A Clock input. The Q output pulse width is set by external capacitor 18 and external resistor 17. The output pulse width is set long enough such that the ringing voltage transitions associated with the bursts of line current activity will retrigger the multivibrator 15 before the output pulse times out, but short enough that the output pulse will time out during the quiescent state between bursts of line current activity. Accordingly, multivibrator 15 will provide one output pulse for each received burst of line current activity. As line current transitions generally occur less then 10 milliseconds apart, in practice, it has been found that an output pulse width of about 10 milliseconds for multivibrator 15 provides the desired output, although this value may change depending on the characteristics of the line current activity being detected. FIG. 2C shows the Q output of multivibrator 15 when the pulse train represented by FIG. 2B is applied to the A input of multivibrator 15. It will be noted that the Q output in effect traces the leading and trailing edges of each burst of signal activity producing six output pulses representing the dialed digit "three".

Monostable multivibrator 27 acts as a second detection means to detect a plurality of bursts of line current activity associated with each digit dialed. With the B and Clear inputs of monostable multivibrator 27 tied high, the /Q output will produce a negative pulse when a negative going voltage transition of the first received dial pulse appears at the A input. The /Q output pulse width is set by external timing capacitor 29 and external resistor 28. The output pulse width is set long enough such that the voltage transitions in consecutive bursts of line current activity associated with a digit dialed will retrigger multivibrator 27 before the output pulse times out, but short enough that the output pulse will time out during the quiescent state between the last burst of line current activity associated with one digit and the first burst of line current activity associated with the following digit in a sequence of digits dialed. As the pulse repetition rate for a given digit dialed is about 10 pulses per second, in practice, it has been found that an output pulse width of about 150 milliseconds for multivibrator 27 provides the desired output although this value may vary slightly depending on the characteristics of the line current activity being detected. The /Q output of multivibrator 27 is used to shift the binary count representing each dialed digit into FIFO shift register storage means 21 and 22 as is more particularly described below.

The Q output of mulitvibrator 15 is applied to counting means 2 through the A Clock input of binary counter 19. With the QD output of binary counter 19 connected to the A Clock input of binary counter 20, a parallel five-bit binary count capability is available on outputs QA, QB, QC, QD of counter 19 and QA of counter 20. The five-bit binary count is incrementable by output pulses from the Q output of multivibrator 15. Five binary bits are required as up to twenty-two bursts of line current activity can be produced by a given telephone handset when the digit "0" is dialed.

The parallel five-bit binary output of binary counters 19 and 20 is applied to inputs D0, D1, D2 and D3 of FIFO shift register 21 and to input D0 of FIFO shift register 22. The five-bit count is shifted into FIFO shift registers 21 and 22 after the last burst of line current activity associated with a dialed digit is detected by monostable multivibrator 27. The /Q output of multivibrator 27 which is applied to the shift-in inputs of FIFO shift registers 21 and 22 times out and returns to the high state after the last retriggering transition in the last burst of line current activity associated with a dialed digit is received causing the binary count at the inputs to FIFO shift registers 21 and 22 to be shifted in.

The stored five-bit binary counts representing a plurality of digits may be serially shifted into computer 30 when required. The Data Out Ready outputs of FIFO shift register 22 is used to signal the computer that data is available to be withdrawn. Computer 30 withdraws a sequence of five-bit binary counts by clocking the shift-out inputs of FIFO shift registers 21 and 22. The withdrawal of data from counting means 2 by conversion means 3 can be coordinated with the supply of a message or instruction to the caller by, for example, a computer generated voice. At the beginning of a call, computer 30 resets binary counters 19 and 20 to zero and clears FIFO shift registers 21 and 22 by applying a high signal to the Clear inputs of counters 19 and 20 and the Master Reset inputs of FIFO shift registers 21 and 22. In response to a computer generated instructions, the caller dials the appropriate sequences of digits to supply the requested information. The computer may determine when each sequence is complete by waiting for a predetermined time during which no new data has been detected or by looking for a predetermined number of digits, for example, as would make up a credit card number.

It is not necessary to reset binary counters 19 and 20 to zero between each digit. If desired, the counters may be allowed to "wrap around". In such a case, the binary count stored in FIFO shift registers 21 and 22 will not be numerically equivalent to the number of bursts of line current activity associated with a given digit dialed. It is possible to recover the numerically equivalent count in computer 30 by subtracting the previous count.

Even if binary counters 19 and 20 are to be reset between each digit, the binary counts stored in FIFO shift registers 21 and 22 are not normally numerically equivalent to the corresponding digit dialed. For example, in the case where the digit "three" dialed on a given telephone handset produces line current activity as shown in FIG. 2B, the corresponding count stored FIFO shift registers 21 and 22 will be "six" as shown in FIG. 2C. Accordingly, for this particular handset, in order to decode the numerical value of each digit dialed from the corresponding count stored in FIFO shift registers 21 and 22, computer 30 must be programmed to decode the numerical value of the digit dialed in accordance with the algorithm:

$$COUNT = 2N$$

where COUNT is the binary count stored in FIFO shift registers 21 and 22 and N is the numerical value of the digit dialed.

Not all telephone handsets produce line current pulses similar to those shown in FIG. 2B. As has been noted above, ringing which follows line current impulses produced by dialing can, in certain instances, bridge together individual dial pulses. Furthermore, noise pulses created through the rewind action of some rotary dials and the activation of speech muting circuits can generate additional line current activity which may be detected and counted.

Figure 3B:
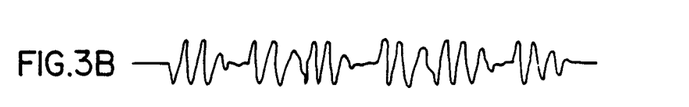
FIGS. 3B and 3C are representations of waveforms which are useful in explaining and illustrating the operation of this invention in association with a second telephone handset.
Figure 3C:
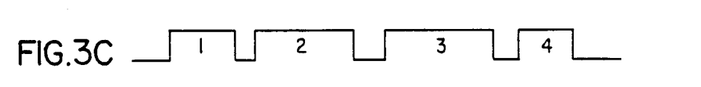

FIG. 3B shows a second representation of the line current activity produced by the dialing action represented in FIG. 2A, as produced by a different rotary telephone handset. As can be seen from FIG. 3B, the ringing following the making and breaking of line current by the rotary dial contacts is sufficient to bridge adjacent bursts of line current activity. FIG. 3C shows the Q output of multivibrator 15 in response to the pulse train represented by FIG. 3B. It will be noted that multivibrator 15 produces four output pulses representing the dialed digit "three". Accordingly, in order to decode the numerical value of the digit dialed for this particular handset, computer 30 must be programmed to decode the numerical value of the digit dialed in accordance with the algorithm:

$$COUNT = N + 1$$

Figure 4A:
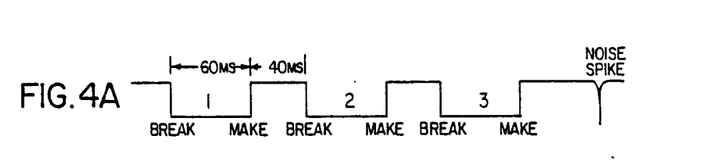
FIGS. 4A, 4B and 4C are representations of waveforms which are useful in explaining and illustrating the operation of this invention in association with a third telephone handset.
Figure 4B:
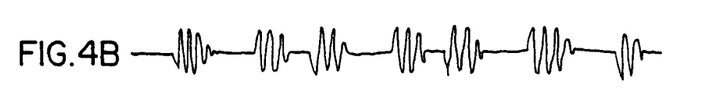
Figure 4C:
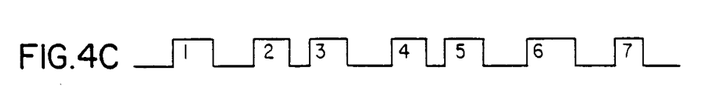

FIG. 4A shows the dialing action represented in FIG. 2A and also shows the presence of a noise spike produced by the speech muting circuit at the beginning of the sequence of pulses. FIG. 4B shows the line current activity produced by the dialing action represented in FIG. 4A. As can be seen from FIG. 4B, the speech muting circuit noise spike has created a burst of line current activity similar to the bursts of line current activity produced by the breaking and making of the line current by the rotary dial contacts. FIG. 4C shows the Q output of multivibrator 15 in response to the bursts of line current activity represented by FIG. 4B. It will be noted that multivibrator 15 produces 7 output pulses presenting the dialed digit "three". Accordingly, for this particular handset, computer 30 must be programmed to decode the numerical value of the digit dialed in accordance with the algorithm:

$$COUNT = 2N + 1$$

While there is wide variation in the number of bursts of line current activity produced by different rotary telephone handsets for a given digit dialed, it has been found that for most telephone handsets, the relationship between the number of bursts of line current activity and the numerical value of the digit dialed is generally consistent, regardless of which digit is dialed. This enables a single conversion algorithm to be generated for each subscriber handset, which algorithm can be used to convert the count associated with each digit dialed into the numerical equivalent of the corresponding digit dialed. In order to generate the appropriate conversion algorithm, each subscriber is asked to use his telephone handset to dial a standard test digit at a predetermined location in the sequence of digits dialed, usually the first digit. After detecting and counting the resulting bursts of line current activity, computer 30 selects the conversion algorithm that expresses the relationship between the number of bursts of line current activity and the numerical value of the standard test digit. The algorithm selected is then applied against the stored counts of the number of bursts of line current activity associated with subsequent non-standard digits to decode the numerical value of each such digit dialed.

In practice, it has been found that the following set of conversion algorithms is sufficient to accurately decode the dialing sequence in approximately 80-90% of rotary phones used.

$$COUNT = N$$

$$COUNT = N + 1$$

$$COUNT = N + 2$$

$$COUNT = 2N$$

$$COUNT = 2N + 1$$

$$COUNT = 2N + 2$$

In each case it can be seen that the algorithm is a simple mathematical formula.

A test digit of "1" or "2" should be avoided as the method of decoding in accordance with the present invention may produce an ambiguity. For example, where the test digit is "2", and the number of bursts of line current activity associated with the test digit is four, the algorithm selected could be either COUNT=N+2 or COUNT=2N.

Figure 5A:
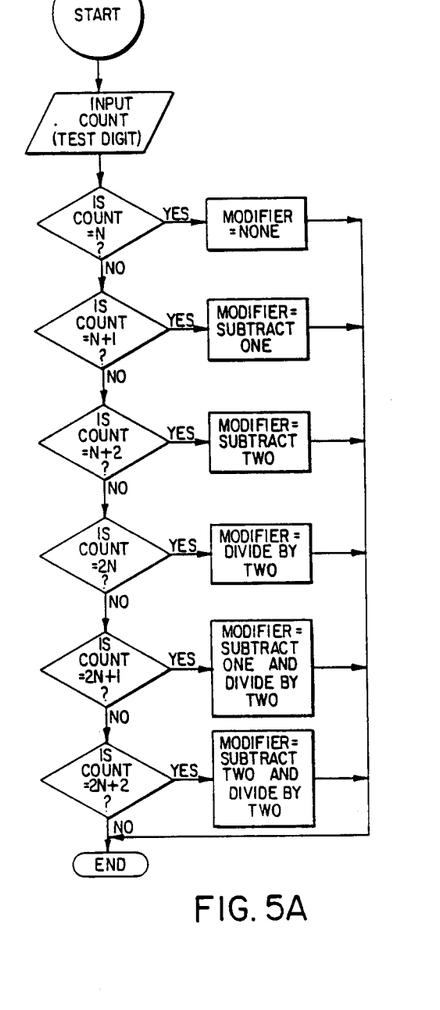
FIGS. 5A and 5B are flowcharts of logical steps which a computer may follow in selecting and applying algorithms in accordance with the present invention.
Figure 5B:
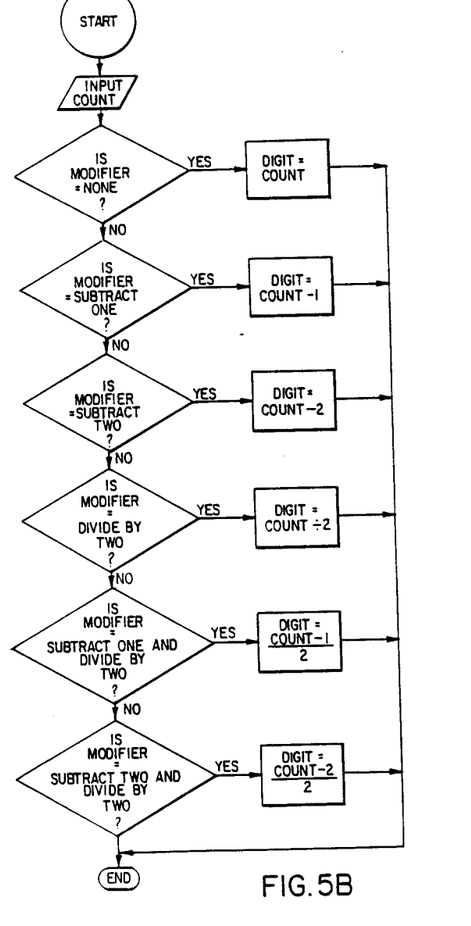

While the method of programming a computer to select and apply simple algorithms is believed to be widely known in the art, FIG. 5A represents a simple flowchart which describes one series of logical steps that the computer 30 may follow in selecting a conversion algorithm based on the count associated with a standard test digit in accordance with the present invention. FIG. 5B represents a simple flowchart which describes a second series of logical steps that computer 30 may follow in applying a conversion algorithm to convert the count associated with a non-standard digit to the numerical value of the digit dialed.

Figure 6A:
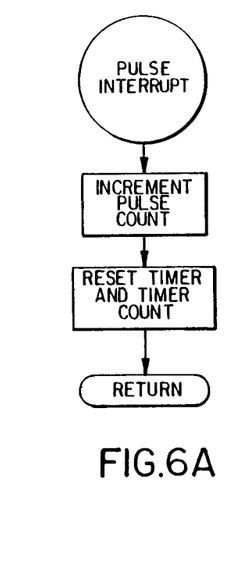
FIGS. 6A, 6B and 6C are flowcharts of logical steps which a programmable logic circuit may follow in counting and storing output counts in accordance with the present invention.
Figures 6B, 6C:
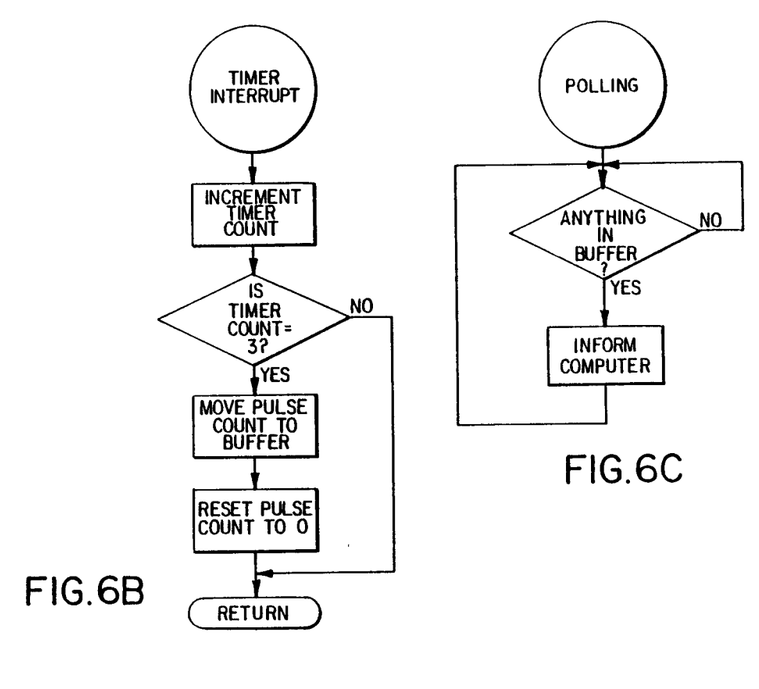

In another embodiment of the invention, the functions of multivibrator 27, binary counters 19 and 20 and FIFO shift registers 21 and 22 can equally be performed by a pre-programmed logic circuit which can, by way of example, be an 8751 microcontroller which is manufactured by Intel. FIGS. 6A, 6B and 6C represent simple flowcharts which describe three series of logical steps which the microcontroller may follow in performing these functions. The Q output of monostable multivibrator 15 is applied to the INTO (P 3.2) port of the 8751 controller which is programmed to generate a hardware interrupt on each falling edge of the Q output pulse. The pulse interrupt routine represented in FIG. 6A increments a pulse count variable and resets a hardware timer. The timer is configured using the Timer 0 of the controller and the timer period is set to 50 milliseconds. When the timer reaches the end of the timer period, it generates a hardware time interrupt. The timer interrupt routine represented in FIG. 6B increments a timer count variable by 1, and determines if the timer count variable equals three. If the timer count variable equals three, 150 milliseconds have passed since the last Q output pulse was received indicating a quiescent period between digits. The pulse count then is moved to a storage buffer and represents the number of discrete bursts of line current activity associated with a particular digit dialed. The buffer is polled periodically by a polling routine represented by FIG. 6C to see if any pulse counts are present. If so, the pulse counts are relayed to computer 30 for conversion to the numerical value of the corresponding digits dialed.

While the invention has been shown and described particularly with reference to the preferred embodiment thereof, it should be understood that those skilled in the art will make further changes without departing from the spirit and scope of the invention is defined in the appended claims.

We claim:

1. A rotary dial pulse receiver for detecting and decoding bursts of line current activity produced by rotary dial action of any one of a plurality of telephone handsets wherein each of said handsets does not necessarily produce the same number of bursts of line current activity for a given digit dialed, comprising:

detection means for detecting each burst of line current activity produced in dialing a sequence of digits from a handset, said sequence including a predetermined test digit at a predetermined location in the sequence of digits dialed;

counting means connected to the detection means for providing an output count of the number of detected bursts of line current activity associated with each digit dialed; and conversion means connected to the counting means and responsive to the detection of said predetermined test digit and to any one of a plurality of possible output counts producible by dialing said predetermined test digit from one of said plurality of handsets for selecting from among a plurality of conversion algorithms a conversion algorithm effective to convert the output count produced in dialing the predetermined test digit by said one handset to the numerical value of said predetermined digit and responsive to the detection of each other digit in said sequence of digits dialed from said one handset for applying said conversion algorithm to convert the output count associated with each other digit dialed by said one handset to its respective numerical value.

2. A rotary dial pulse receiver as defined in claim 1 wherein said detection means is responsive to each said burst of line current activity for producing a single output pulse.

3. A rotary dial pulse receiver as defined in claim 2 wherein said detection means is a retriggerable monostable multivibrator arranged such that the voltage transitions associated with each of said bursts of line current activity will retrigger said multivibrator before said output pulse times out and the quiescent state between said bursts of line current activity will allow said output pulse to time out.

4. A rotary dial pulse receiver as defined in claim 1 wherein said counting means is a preprogrammed logic unit.

5. A rotary dial pulse receiver as defined in claim 2 wherein said counting means is a preprogrammed logic unit.

6. A rotary dial pulse receiver as defined in claim 3 wherein said counting means is a preprogrammed logic unit.

7. A rotary dial pulse receiver as defined in claim 1 wherein said detection means comprises first detection means responsive to each said burst of line current activity for producing a single first output pulse and a second detection means responsive to a plurality of said bursts of line current activity associated with each digit dialed to produce a second output pulse.

8. A rotary dial pulse receiver as defined in claim 7 wherein said counting means comprises a binary counter connected to said first detection means and incrementable by said first output pulse and a storage means connected to said second detection means and responsive to said second output pulse for storing a plurality of said output counts associated with said sequence of digits dialed.

9. A rotary dial pulse receiver as defined in claim 8 wherein said storage means is a FIFO shift register and second output pulses are applied to the shift register to cause said output counts to be shifted into said register.

10. A rotary dial pulse receiver as defined in claim 7 wherein said first detection means is a retriggerable monostable multivibrator arranged such that the voltage transitions associated with each said burst of line current activity will retrigger said multivibrator before it times out and the quiescent state between each said burst of line current activity will allow said multivibrator to time out.

11. A rotary dial pulse receiver as defined in claim 8 wherein said first detection means is a retriggerable monostable multivibrator arranged such that the voltage transitions associated with each said bursts of line current activity will retrigger said multivibrator before it times out and the quiescent state between each said burst of line current activity will allow said multivibrator to time out.

12. A rotary dial pulse receiver as defined in claim 9 wherein said first detection means is a retriggerable monostable multivibrator arranged such that the voltage transitions associated with each said burst of line current activity will retrigger said multivibrator before it times out and the quiescent state between each said burst of line current activity will allow said multivibrator to time out.

13. A rotary dial pulse receiver as defined in claim 7 wherein said second detection means is a retriggerable monostable multivibrator arranged such that consecutive bursts in each plurality of said bursts of line current activity associated with a digit dialed will retrigger said multivibrator before it times out and the quiescent state between each plurality of said bursts of line current activity associated with consecutive digits in a sequence of digits dialed will allow said multivibrator to time out.

14. A rotary dial pulse receiver as defined in claim 8 wherein said second detection means is a retriggerable monostable multivibrator arranged such that consecutive bursts in each plurality of said bursts of line current activity associated with a digit dialed will retrigger said multivibrator before it times out and the quiescent state between each plurality of said bursts of line current activity associated with consecutive digits in a sequence of digits dialed will allow said multivibrator to time out.

15. A rotary dial pulse receiver as defined in claim 9 wherein said second detection means is a retriggerable monostable multivibrator arranged such that consecutive bursts in each plurality of said bursts of line current activity associated with a digit dialed will retrigger said multivibrator before it times out and the quiescent state between each plurality of said bursts of line current activity associated with consecutive digits in a sequence of digits dialed will allow said multivibrator to time out.

16. A rotary dial pulse receiver according to claim 1, wherein the counting means is such as to count handset induced noises spikes similar to or exceeding the amplitude of the bursts of line current activity produced by the make and beak action which characterizes said rotary dial action, whereby said output count includes any such noise spikes.

17. A method of decoding bursts of line current activity produced by rotary dial action of any one of a plurality of telephone handsets wherein each of said handsets does not necessarily produce the same number of bursts of line current activity for a given digit dialed comprising the steps of:
providing a count of the number of bursts of line current activity produced by a handset in dialing a predetermined test digit at a predetermined location in a sequence of digits dialed;
selecting from among a plurality of conversion algorithms, and in response to any one of a plurality of possible counts producible by dialing said predetermined test digit from one of said plurality of handsets, a conversion algorithm effective to convert the output count produced by dialing said predetermned test digit from said one handset to the numerical value of said predetermined test digit dialed;
providing a count of the number of bursts of line current activity produced by dialing from said one handset each other digit in said sequence of digits; and
applying said conversion algorithm to convert the count produced by dialing from said one handset each said other digit in said sequence of digits dialed by said one handset to its respective numerical value.

18. A method as defined is claim 17 wherein the predetermined location is the first digit in the sequence of digits dialed.

19. A method of decoding bursts of line current activity produced by rotary dial action of any one of a plurality of telephone handsets wherein each of said handsets does not necessarily produce the same number of bursts of line current activity for a given digit dialed comprising the steps of:
detecting each burst of line current activity produced by a handset in dialing a sequence of digits and producing one output pulse for each of said bursts;
counting said output pulses and producing an output count of the number of output pulses associated with each digit dialed;
storing a plurality of said output counts associated with said sequence of digits dialed;
indentifying the output count associated with a test digit of predetermined numerical value in a predetermined location in said sequence of digits dialed;
selecting from among a plurality of conversion algorithms, and in response to any one of a plurality of possible output counts producible in dialing said predetermined test digit from one of said plurality of handsets, a conversion algorithm effective to convert the output count produced by dialing said test digit from said one handset to its predetermined numerical value; and
applying said conversion algorithm to convert the output count produced by dialing from said one handset each said other digit in said sequence of digits dialed by said one handset to its respective numerical value.

20. A method as defined in claim 19 wherein the predetermined location is the first digit in the sequence of digits dialed.

21. A rotary dial pulse receiver comprising:
detection means for detecting each burst of line current activity exceeding a threshold voltage, said bursts being of the kind produced by rotary dial action in dialing a sequence of digits from a handset, said sequence including a predetermined test digit at a predetermined location in the sequence of digits dialed;
counting means connected to the detection means for providing an output count of the number of detected bursts of line current activity associated with each digit dialed; and
conversion means connected to the counting means and arranged to compare said output count associated with the predetermined test digit to the numerical value of said predetermined digit dialed and arranged to use such comparison to select from among a plurality of mathematical formulae one which, when applied to said output count, converts this output count to the numerical value of said test digit, and responsive to the detection of other of said bursts exceeding said threshold voltage and which correspond to other digits in said sequence of digits dialed from the handset for applying said one mathematical formula to convert the output count associated with each other digit to its respective numerical value.

22. A method of decoding bursts of line current activity produced by rotary dial action in dialing a sequence of digits comprising the steps of:
 counting the number of bursts of line current activity which exceed a threshold voltage, said bursts being of the kind produced by a handset by dialing a predetermined test digit at a predetermined location in a sequence of digits dialed;
 comparing said output count with said predetermined test digit and selecting a mathematical formula effective to convert the counted number of said bursts of line current activity produced by dialing said predetermined test digit to the numerical value of said predetermined test digit dialed;
 counting the number of bursts of line current activity exceeding said threshold voltage produced by dialing each other digit in said sequence of digits; and
 applying said mathematical formula to convert the number of bursts of line current activity counted upon dialing each said other digit dialed.

23. A rotary dial pulse receiver according to claim 21, wherein the counting means is such as to count handset induced noise spikes, similar to or exceeding the amplitude of bursts of line current activity produced by the make and break action which characterizes said rotary dial action, whereby said output count includes any such noise spikes.

* * * * *